(12) United States Patent
Fetchko et al.

(10) Patent No.: US 10,781,947 B2
(45) Date of Patent: Sep. 22, 2020

(54) HOSE ASSEMBLY FOR BULKHEAD OF MARINE VESSEL

(71) Applicant: MARINE CANADA ACQUISITION INC., Richmond (CA)

(72) Inventors: Eric B. Fetchko, Burnaby (CA); Davor Baros, Vancouver (CA); Art Ferguson, Glenview, IL (US)

(73) Assignee: Marine Canada Acquisition Inc., Richmond (CA)

( * ) Notice: Subject to any disclaimer, the term of this patent is extended or adjusted under 35 U.S.C. 154(b) by 87 days.

(21) Appl. No.: 16/131,920

(22) Filed: Sep. 14, 2018

(65) Prior Publication Data
US 2019/0078707 A1 Mar. 14, 2019

Related U.S. Application Data

(60) Provisional application No. 62/558,448, filed on Sep. 14, 2017.

(51) Int. Cl.
| | |
|---|---|
| *F16L 11/12* | (2006.01) |
| *F16L 57/02* | (2006.01) |
| *B23P 19/04* | (2006.01) |
| *F16L 55/115* | (2006.01) |
| *F16L 5/08* | (2006.01) |
| *F16L 5/10* | (2006.01) |

(52) U.S. Cl.
CPC ............. *F16L 11/12* (2013.01); *B23P 19/04* (2013.01); *F16L 5/08* (2013.01); *F16L 5/10* (2013.01); *F16L 55/115* (2013.01); *F16L 57/02* (2013.01)

(58) Field of Classification Search
CPC ..... F16L 57/02; G02B 6/4478; H01R 13/562; Y10T 403/27; E21B 17/017
USPC ....... 138/110, 109; 174/65 R, 654, 669, 668, 174/660; 285/305, 314, 154.1, 206, 921
See application file for complete search history.

(56) References Cited

U.S. PATENT DOCUMENTS

| | | | |
|---|---|---|---|
| 1,977,775 A | 10/1934 | Patterson | |
| 4,367,967 A * | 1/1983 | Albert, Jr. ............ | G02B 6/4478 138/110 |
| 4,445,713 A | 5/1984 | Bruning | |

(Continued)

FOREIGN PATENT DOCUMENTS

WO 2017132361 A1 8/2017

OTHER PUBLICATIONS

SeaStar Solutions, Installation instructions—Polished Bulkhead Dual Hose Kit, Feb. 2014. (Year: 2014).*

(Continued)

*Primary Examiner* — Patrick F Brinson
(74) *Attorney, Agent, or Firm* — Berenato & White, LLC

(57) ABSTRACT

An improved hose assembly for a marine vessel bulkhead comprises a hose having a first end with a first hose fitting and a second end with a second hose fitting. There is a base plate having an opening which receives the hose. The base plate is positioned on the hose between the first hose fitting and the second hose fitting. There is a bend restrictor releasably coupled to the base plate. The bend restrictor has coils which wrap around the hose. The base plate clamps onto the bend restrictor and the bend restrictor clamps onto the hose, thereby restricting relative axial and rotational movement of the hose.

12 Claims, 17 Drawing Sheets

(56) References Cited

U.S. PATENT DOCUMENTS

| | | | | |
|---|---|---|---|---|
| 5,068,496 | A * | 11/1991 | Favalora | F16L 5/06 |
| | | | | 174/654 |
| 5,246,254 | A | 9/1993 | Lojacono, Jr. et al. | |
| 5,539,164 | A | 7/1996 | Van Ruiten | |
| 5,816,622 | A * | 10/1998 | Carter | F16L 33/00 |
| | | | | 285/45 |
| 6,109,306 | A | 8/2000 | Kleinert et al. | |
| 6,220,303 | B1 * | 4/2001 | Secher | E21B 17/017 |
| | | | | 138/110 |
| 6,511,099 | B2 * | 1/2003 | Bartholoma | F16L 5/06 |
| | | | | 174/151 |
| 7,357,424 | B2 | 4/2008 | Powell et al. | |
| 7,963,299 | B2 * | 6/2011 | Sheldrake | E21B 17/017 |
| | | | | 138/109 |
| 8,936,047 | B2 | 1/2015 | Hahn et al. | |
| 10,393,306 | B2 * | 8/2019 | Skarnes | F16L 5/00 |
| 2006/0180228 | A1 * | 8/2006 | Filho | F16L 35/00 |
| | | | | 138/153 |
| 2009/0199923 | A1 * | 8/2009 | Standal | B29C 70/08 |
| | | | | 138/124 |
| 2012/0234424 | A1 | 9/2012 | Bernhardt | |
| 2012/0241037 | A1 * | 9/2012 | Lund | E21B 17/017 |
| | | | | 138/106 |
| 2015/0020910 | A1 * | 1/2015 | Pedersen | E21B 17/017 |
| | | | | 138/106 |
| 2017/0211735 | A1 | 7/2017 | Papafagos et al. | |

OTHER PUBLICATIONS

International Search Report—PCT/CA2018/051148—dated Dec. 5, 2018.
Heyco, a Penn Engineering Company—"Stay Connected" with Heyco Liquid Tight Cordgrips—Heyco—Tite Liquid Tight Cordgrips.
Seastar Solutions—Installation Instructions—Seastar Polished Bulkhead Single Hose Kits—Feb. 2014.

* cited by examiner

HOSE ASSEMBLY FOR BULKHEAD OF MARINE VESSEL

TECHNICAL FIELD

The present disclosure relates to a hose assembly and, in particular, to a hose assembly for a bulkhead of a marine vessel.

BACKGROUND

Hose assemblies for bulkheads of marine vessels generally comprise a base plate and a bend restrictor. These components are typically assembled on the hose before the hose end fittings are swaged on. This is due to the fact that the hose end fittings are larger than the through holes of the base plate and the bend restrictor. As a result, if the hose is damaged or worn out, then the entire hose assembly generally needs to be replaced.

SUMMARY

There is provided an improved hose assembly for a marine vessel bulkhead. The hose assembly comprises a hose having a first end with a first hose fitting and a second end with a second hose fitting. There is a base plate having an opening which receives the hose. The base plate is positioned on the hose between the first hose fitting and the second hose fitting. There is a bend restrictor releasably coupled to the base plate. The bend restrictor has coils which wrap around the hose. The base plate clamps onto the bend restrictor and the bend restrictor clamps onto the hose, thereby restricting relative axial and rotational movement of the hose.

The bend restrictor may include a plurality of circumferentially spaced-apart tabs extending outwardly about a first end thereof. The tabs may interlock with the base plate to couple the bend restrictor to the base plate. Each of the tabs may have a barbed tip.

There may be an annular insert disposed between the hose and the bend restrictor. The bend restrictor may have a first end with a first gap and a second end with a second gap. The first gap may be wider than the second gap to receive the annular insert. The annular insert may have a longitudinal slit and the annular insert may be insertable over the hose at the slit.

The base plate may include two interlocking halves. The base plate may include a first portion and a second portion. The first portion and the second portion may be hingedly connected to allow the first portion to pivot relative to the second portion. The base plate may be a dual base plate configured to receive two bend restrictors. There may be a cover plate positioned over the base plate.

There is also provided a method of installing a bend restrictor assembly on a hose for a marine vessel bulkhead in which the hose has a first end with a first hose fitting and a second end with a second hose fitting. The method comprises inserting a base plate with an opening over the first hose fitting and onto the hose. The hose is inserted through a first gap in a bend restrictor, coils of the bend restrictor are wrapped around the hose, and the hose is inserted through a second gap of the bend restrictor. The hose is inserted through a slit in an annular insert so that the annular insert is received by the first gap in the bend restrictor. The bend restrictor is inserted into the opening of the base plate, thereby compressing the first gap of the bend restrictor so that the bend restrictor clamps onto the annular insert and the hose to restrict relative axial and rotational movement of the hose.

There is further provided another method of installing a bend restrictor assembly on a hose for a marine vessel bulkhead in which the hose has a first end with a first hose fitting and a second end with a second hose fitting. The method comprises inserting the hose through a first gap in a bend restrictor, wrapping coils of the bend restrictor around the hose, and inserting the hose through a second gap of the bend restrictor. Two crescent-shaped halves of a base plate are then clamped onto the bend restrictor near the first gap thereof so that the bend restrictor clamps onto the hose to restrict relative axial and rotational movement of the hose.

The two crescent-shaped halves of the base plate may be clamped together by interlocking and coupling the two crescent-shaped halves together with a fastener. Alternatively, the two crescent-shaped halves of the base plate may be clamped together by pivoting a first crescent-shaped half of the base plate relative to a second crescent-shaped half of the base plate.

DESCRIPTION OF PREFERRED EMBODIMENT(S)

Figure 1:
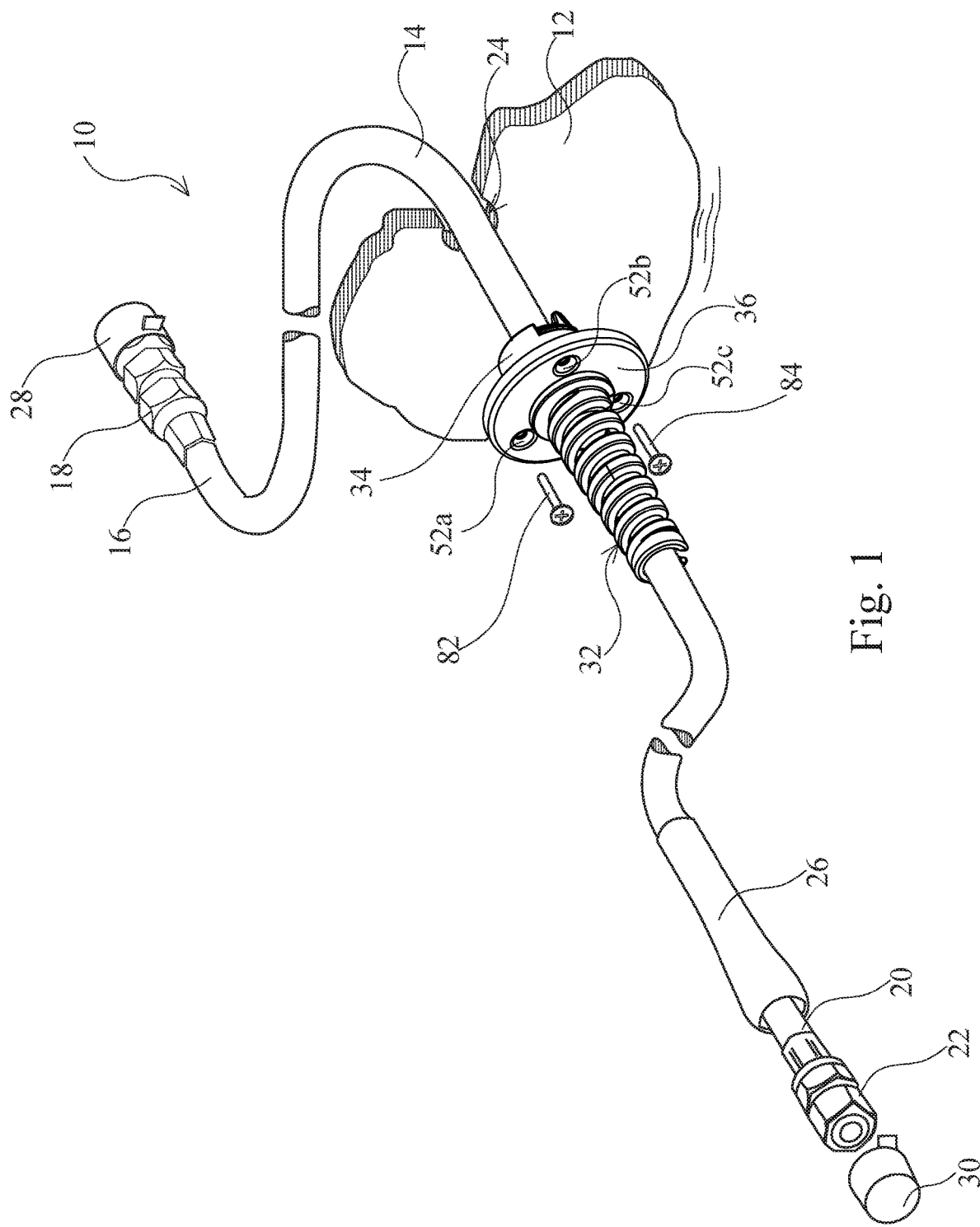
FIG. 1 is a perspective view of a hose assembly installed in a bulkhead, the bulkhead being shown in fragment.

Referring to the drawings and first to FIG. 1, there is shown a hose assembly 10 for a bulkhead 12 of a marine vessel. The bulkhead 12 may be a splashwell of the marine vessel. The hose assembly 10 includes a hose 14 having a first end 16 with a first hose fitting 18 and a second end 20 with a second hose fitting 22. The hose fittings 18 and 22 may be swage fittings. The hose 14 extends through an opening 24 in the bulkhead 12. The first end 16 of the hose 14 is connected to a helm pump (not shown) of a steering system of the marine vessel via the first hose fitting 18. The second end 20 of the hose 14 is connected to a steering cylinder (not shown) of a propulsion unit of the marine vessel via the second hose fitting 22. There may be a conventional bend restrictor 26 located proximal to the second end 20 of the hose 14. The bend restrictor 26 may be positioned over the second hose fitting 22 after connecting the second hose fitting 22 to the steering cylinder. The hose assembly 10 may be provided with end caps 28 and 30 for protecting the hose fittings 18 and 22, respectively, until the hose 14 is ready to be connected to the helm pump and the steering cylinder.

Figure 2:
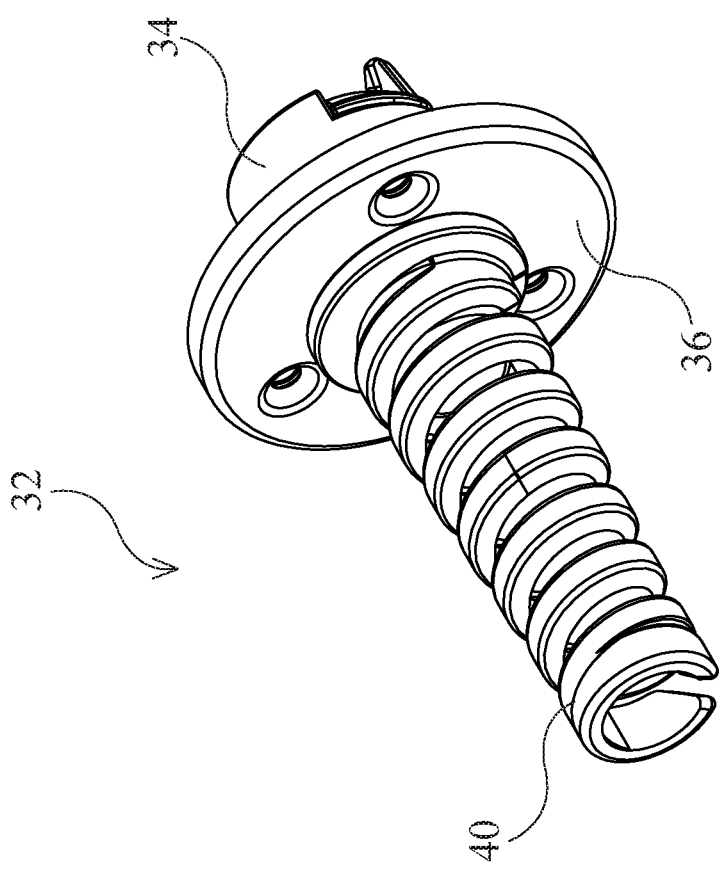
FIG. 2 is a perspective view of a first embodiment of a bend restrictor assembly of the hose assembly of FIG. 1.

The hose assembly 10 also includes a bend restrictor assembly 32 for restricting bending or kinking of the hose 14 at its exit point from the opening 24 in the bulkhead 12. The bend restrictor assembly 32 is shown in greater detail in FIGS. 2 and 3, and includes a base plate 34, a cover plate 36, an annular insert or grommet 38, and a strain relief member in the form of a coil member 40. The base plate 34 includes a disc portion 42 and a cylindrical portion 44. There is a central opening 46 extending through the disc portion 42 and a plurality of apertures, for example, apertures 48a, 48b, and 48c extending circumferentially about the central opening 46. Similarly, the cover plate 36 is annular in shape in this example, and includes a central opening 50. There is a plurality of apertures, for example, apertures 52a, 52b, and 52c extending circumferentially about the central opening 50.

Figure 3:
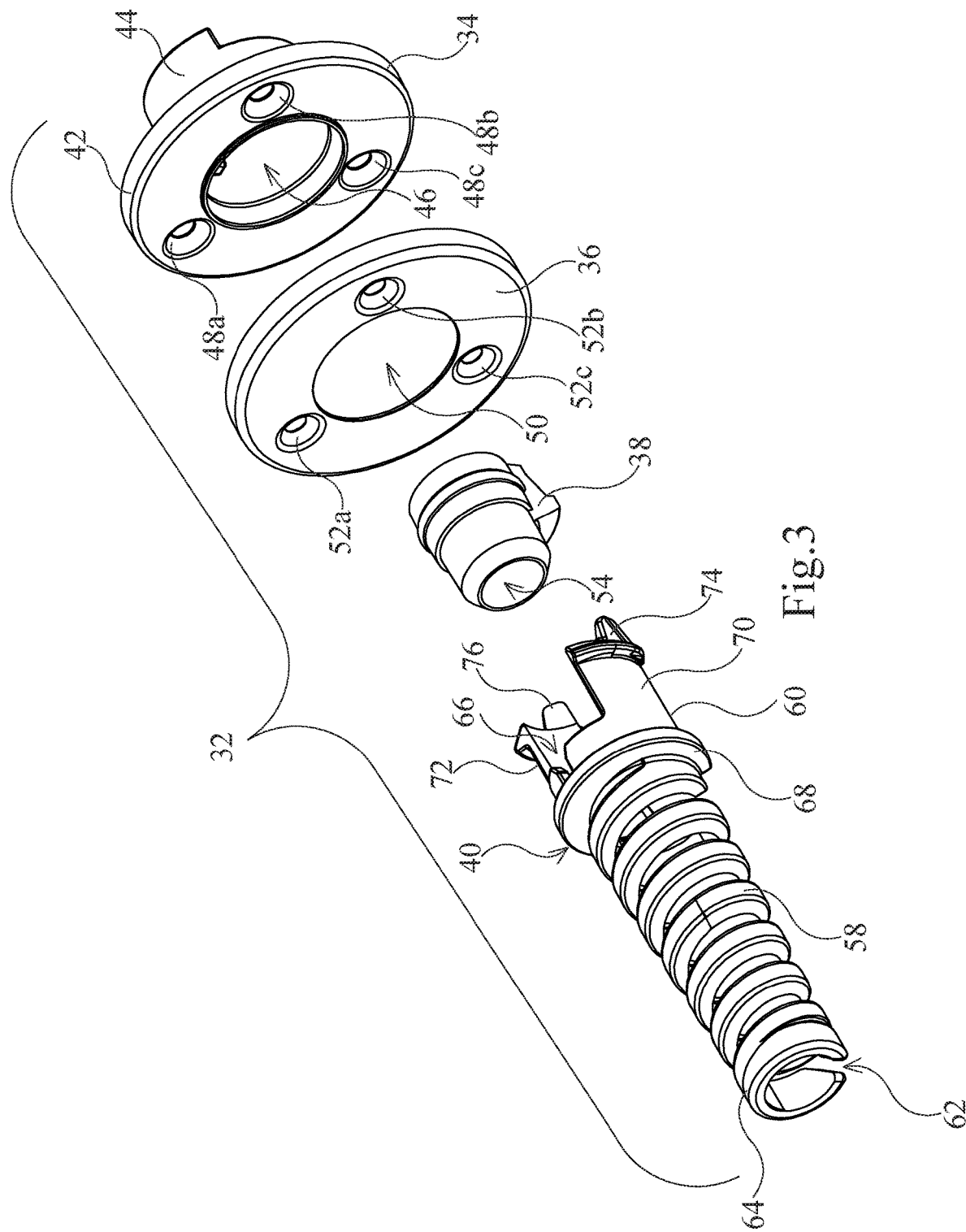
FIG. 3 is an exploded view of the bend restrictor assembly of FIG. 2.
Figure 5:
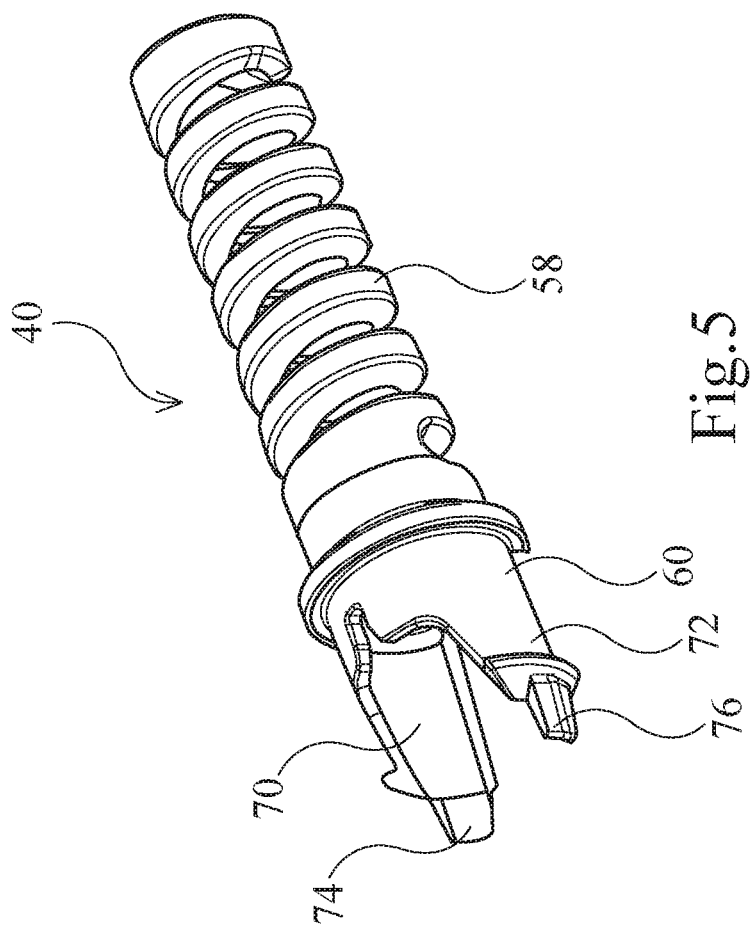
FIG. 5 is a perspective view of a coil member of the bend restrictor assembly of FIG. 2.
Figure 4:
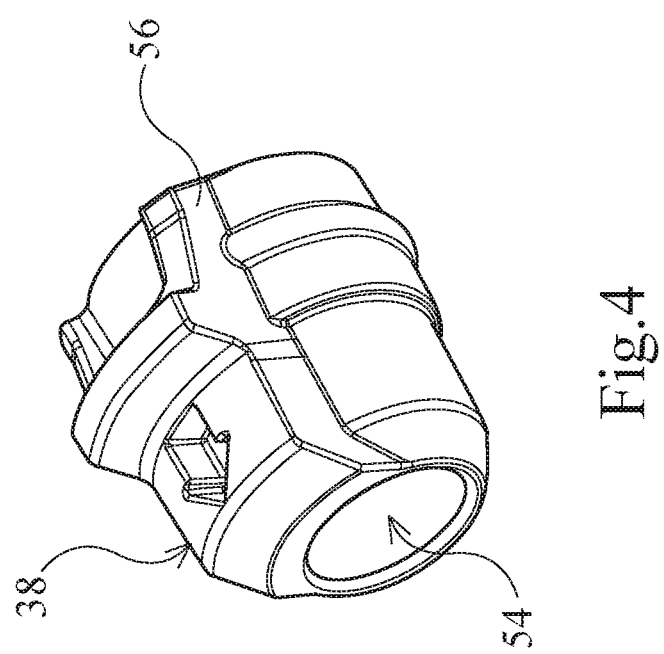
FIG. 4 is a perspective view of a grommet of the bend restrictor assembly of FIG. 2.

As best shown in FIG. 4, the grommet 38 has a generally tubular shape with a central opening 54. There is also a slit 56 extending longitudinally along the grommet 38. Referring to FIG. 5, the coil member 40 includes a resilient coil 58 and a base portion 60. There is a gap 62 in the coil 58 at a distal end 64 thereof. There is also a gap 66 in the base portion 60 as shown in FIG. 3. The gap 66 in the base portion 60 is wider than the gap 62 in the coil 58 to allow the base portion 60 to receive the grommet 38. In this example, the circumference of the coil 58 tapers from a proximal end 68 thereof towards the distal end 64. There are one or more tabs, for example, tabs 70 and 72 extending outwardly from the base portion 60 of the coil member 40. Each of the tabs terminates in a barbed tip as shown by a barbed tip 74 of the tab 70 and a barbed tip 76 of the tab 72.

Figure 7:
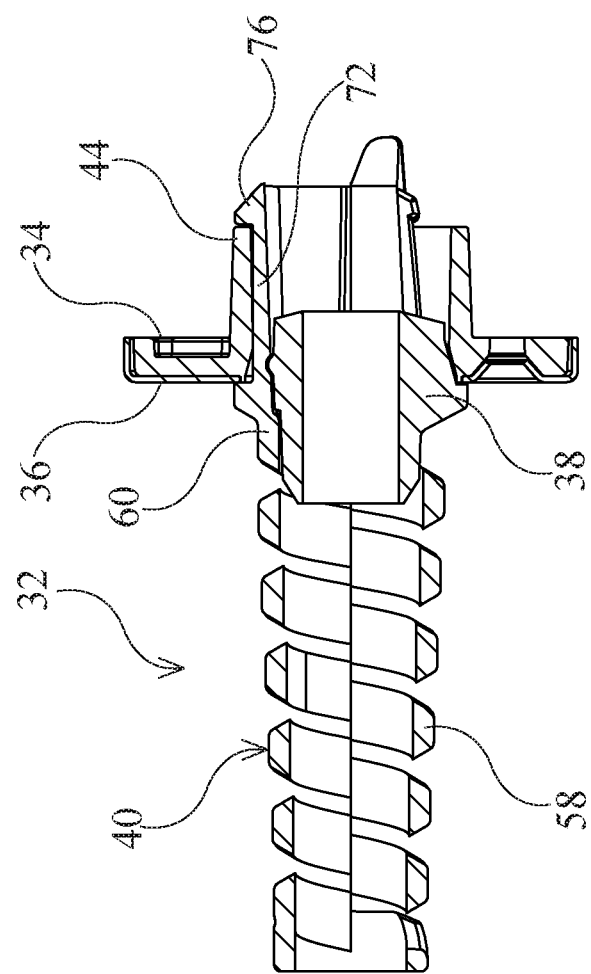
FIG. 7 is a cross-sectional view of the bend restrictor assembly of FIG. 2 taken along line 7-7 of FIG. 6.
Figure 6:
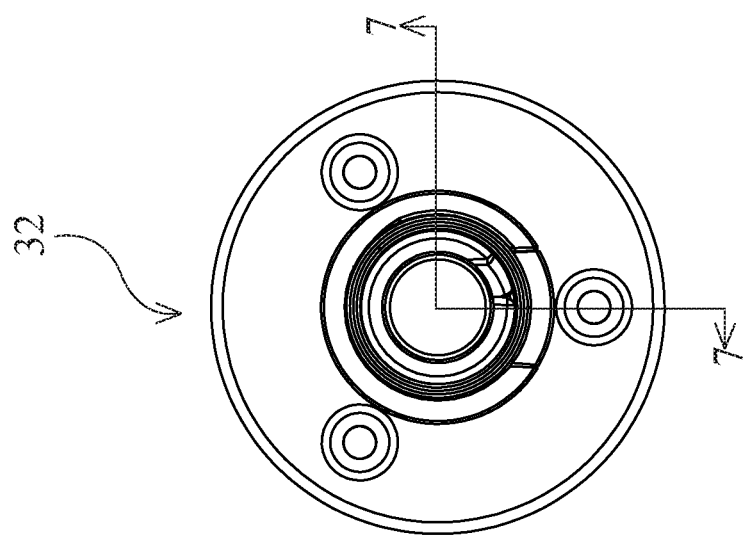
FIG. 6 is an end view of the bend restrictor assembly of FIG. 2.

FIG. 6 is an end view of the bend restrictor assembly and FIG. 7 shows a cross-sectional view of the assembled bend restrictor assembly 32 taken along line 7-7 of FIG. 6. The grommet 38 is inserted into the base portion 60 of the coil member 40 through the gap 66, shown in FIG. 3. Referring back to FIG. 7, the base portion 60 of the coil member 40 is inserted into the cover plate 36 and the base plate 34 through their respective openings 50 and 46, shown in FIG. 3. The barbed tips 74 and 76 of the tabs 70 and 72 engage the cylindrical portion 44 of the base plate 34 to securely couple the coil member 40 to the base plate 34 and the cover plate 36, as shown by the barbed tip 76 of the tab 72 engaging the cylindrical portion 44 of the base plate 34 in FIG. 7.

Figure 8:
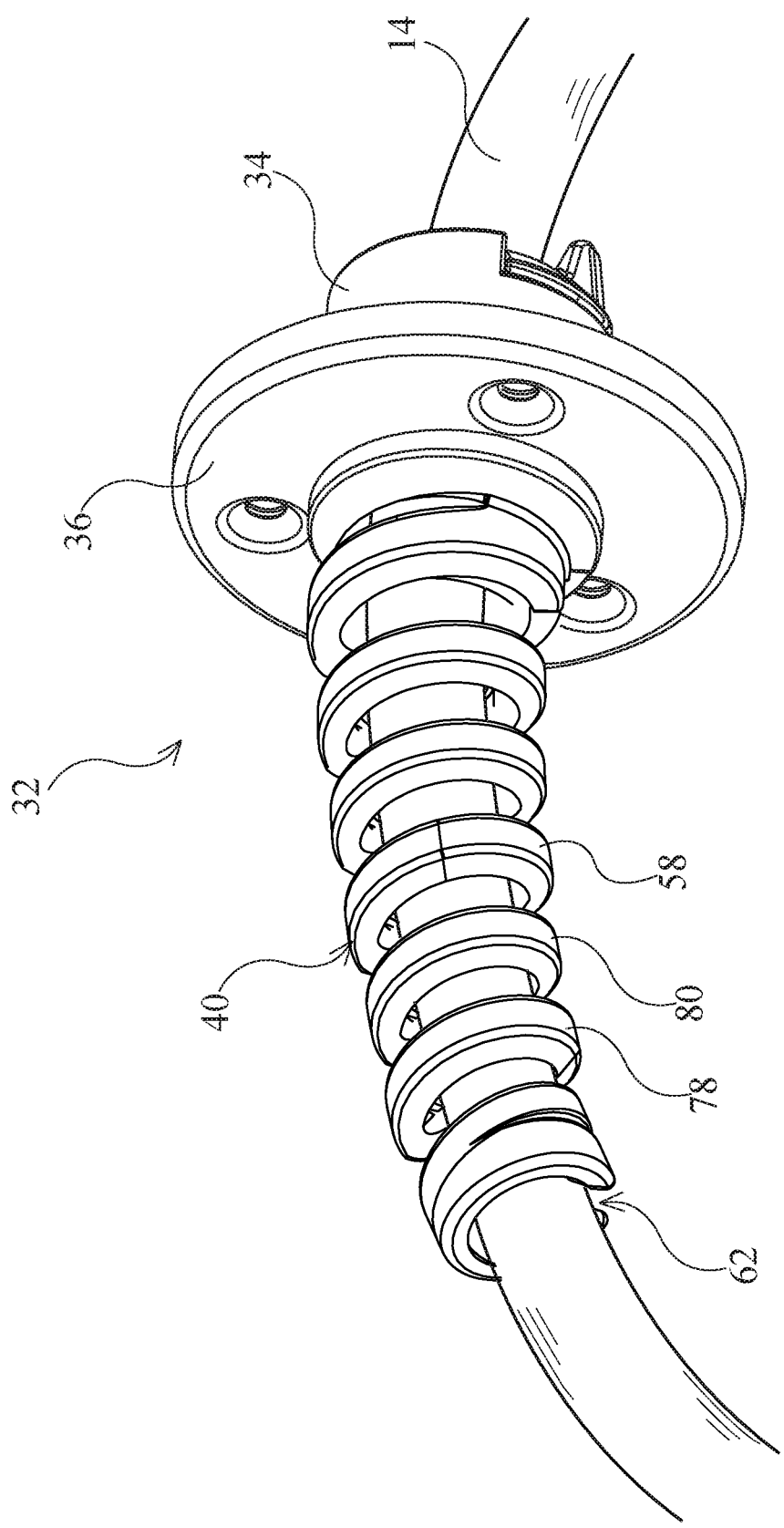
FIG. 8 is an enlarged, perspective view of the bend restrictor assembly of FIG. 2 installed on a hose.
Figure 9:
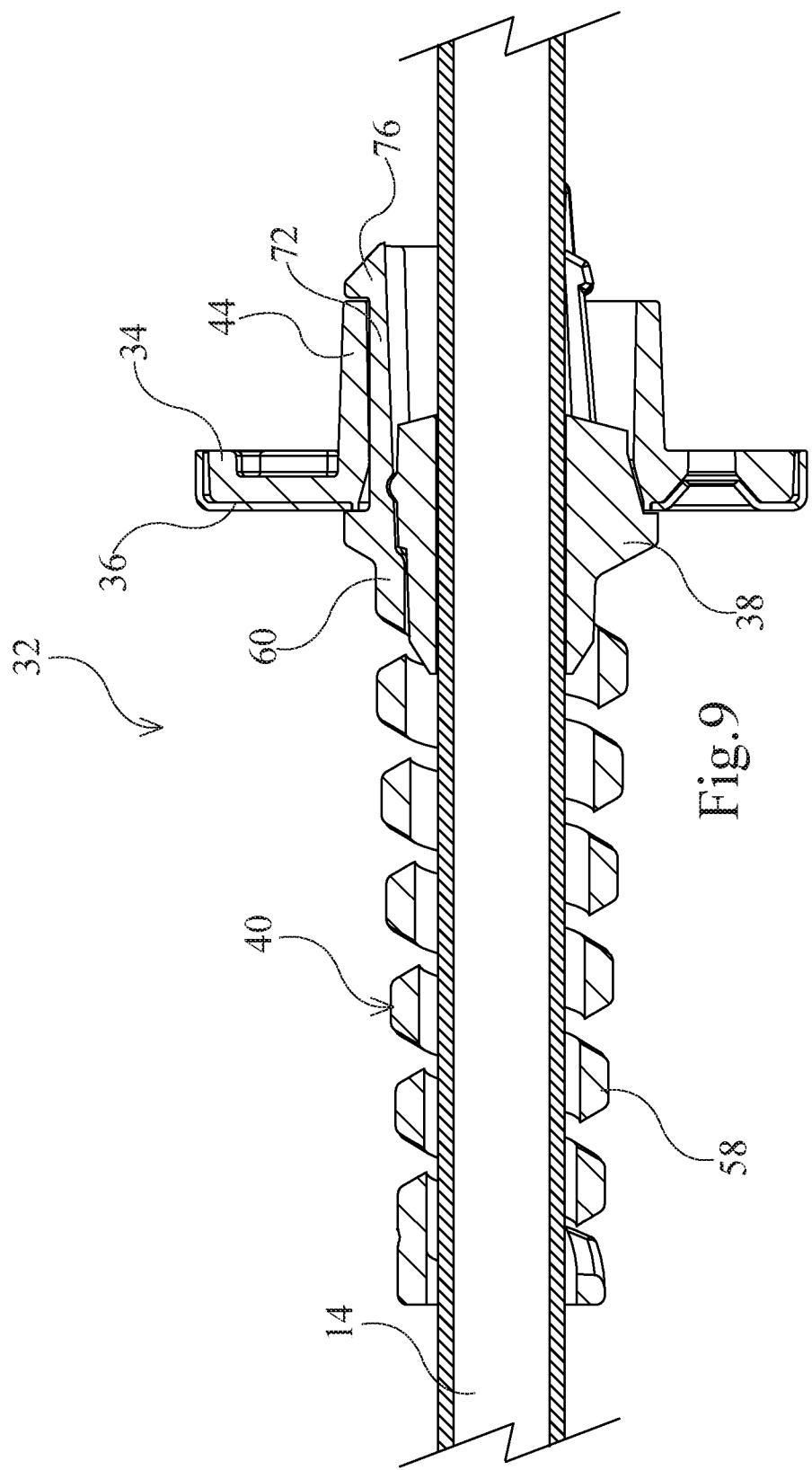
FIG. 9 is a cross-sectional view of the bend restrictor assembly of FIG. 2 installed on the hose.

The bend restrictor assembly 32 is configured to be installed on a hose after the hose fittings have been installed. Each of the respective openings 46 and 50 of the base plate 34 and the cover plate 36, shown in FIG. 3, has a circumference which is greater than a circumference of the hose fitting 22, shown in FIG. 1, which allows the base plate 34 and the cover plate 36 to fit over the hose fitting 22 and slide onto the hose 14. FIGS. 8 and 9 show the bend restrictor assembly 32 installed on the hose 14 in greater detail. The hose 14 is inserted into the coil member 40 through the gap 62 in the coil 58. Individual coils of the coil 58, for example, coils 78 and 80, are then wrapped around the hose 14. The hose 14 is next inserted through the gap 66 in the base portion 60, shown in FIG. 3, so the coil member 40 is completely wrapped around the hose 14. The grommet 38 is inserted into the gap 66 of the base portion 60 of the coil member 40 and is pushed over the hose 14 at its slit 56, shown in FIG. 4. The base portion 60 of the coil member 40 is then inserted into the cover plate 36 and the base plate 34 through the respective openings 50 and 46.

As the base portion 60 of the coil member 40 is inserted into the cover plate 36 and the base plate 34, the gap 66 in the base portion 60 is compressed, thereby clamping the coil member 40 onto the grommet 38 and the hose 14 so the base plate fits tightly about the hose 14. This clamping force restricts axial and rotational movement of the hose 14 relative to the base plate 34. However, the flexibility of the coil member 40 inhibits bending or kinking of the hose 14 once installed as shown in FIG. 9. The engagement between the barbed tips of the coil member 40 and the cylindrical portion 44 of the base plate 34 ensures that the coil member 40 is securely coupled to the base plate 34 and the cover plate 36, as shown by the barbed tip 76 of the tab 72 engaging the cylindrical portion 44 of the base plate 34.

Referring back to FIG. 3, the apertures 48a, 48b, and 48c in the base plate 34 and the apertures 52a, 52b, and 52c in the cover plate 36 align with each other and each receives a respective one of fasteners, for example, fasteners 82 and 84 shown in FIG. 1 to mount the base plate 34 and the cover plate 36 to the bulkhead 12.

Figure 10:
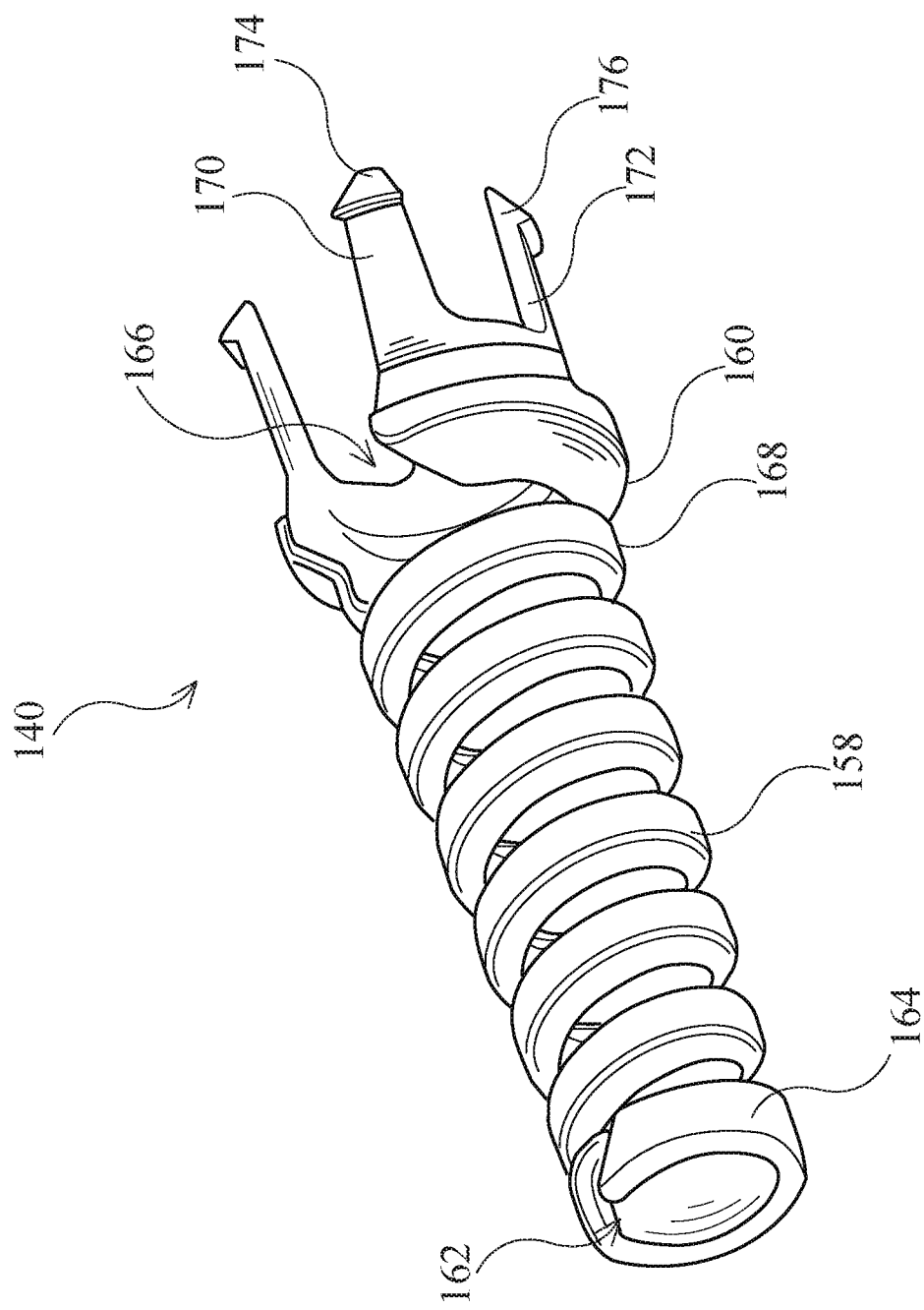
FIG. 10 is a front perspective view of another coil member for the bend restrictor assembly of FIG. 2.
Figure 11:
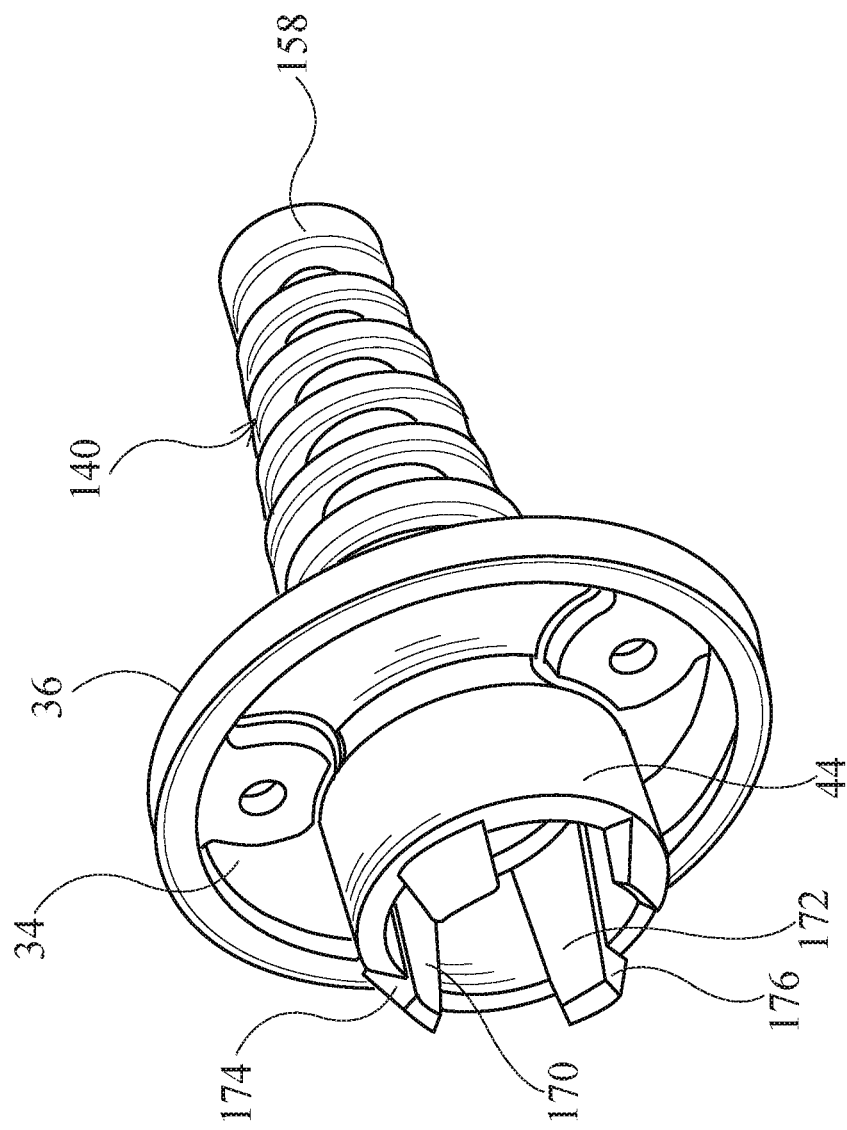
FIG. 11 is a rear perspective view of the coil member of FIG. 10 in use with the bend restrictor assembly of FIG. 2.

FIG. 10 shows another coil member 140 which may be used with the bend restrictor assembly 32. The coil member 140 includes a coil 158 and a base portion 160. There is a gap 162 in the coil 158 at a distal end 164 thereof. There is also a gap 166 in the base portion 160. The gap 166 in the base portion 160 is wider than the gap 162 in the coil 158 to allow the base portion 160 to receive the grommet 38. In this example, the circumference of the coil 158 tapers from a proximal end 168 thereof towards the distal end 164. There is a plurality of circumferentially spaced-apart tabs, for example, tabs 170 and 172 extending outwardly from and about the base portion 160 of the coil member 140. Each of the tabs terminates in a barbed tip as shown by a barbed tip 174 of the tab 170 and a barbed tip 176 of the tab 172. As best shown in FIG. 11, the barbed tips 174 and 176 of the tabs 170 and 172 engage the cylindrical portion 44 of the base plate 34 to securely couple the coil member 140 to the base plate 34 and the cover plate 36.

Figure 12:
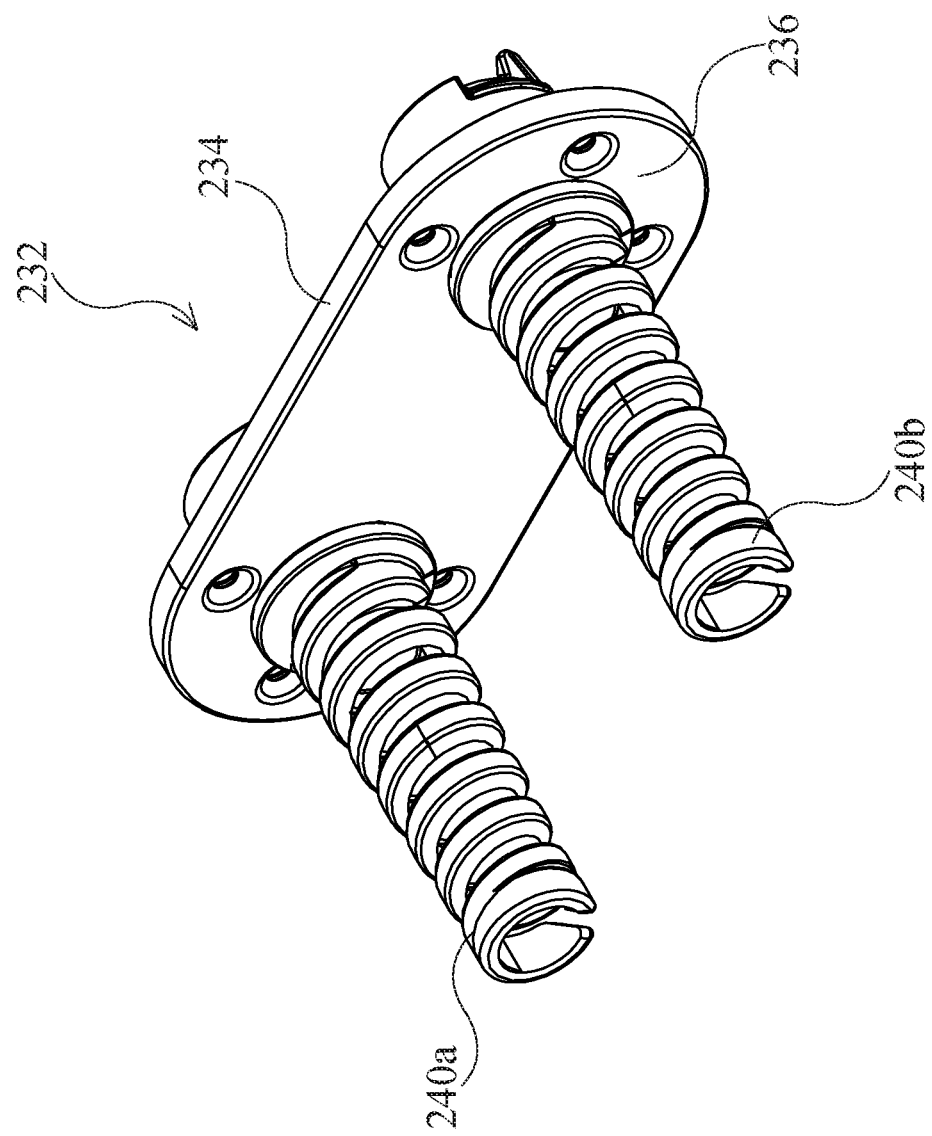
FIG. 12 is a perspective view of a second embodiment of a bend restrictor assembly.
Figure 13:
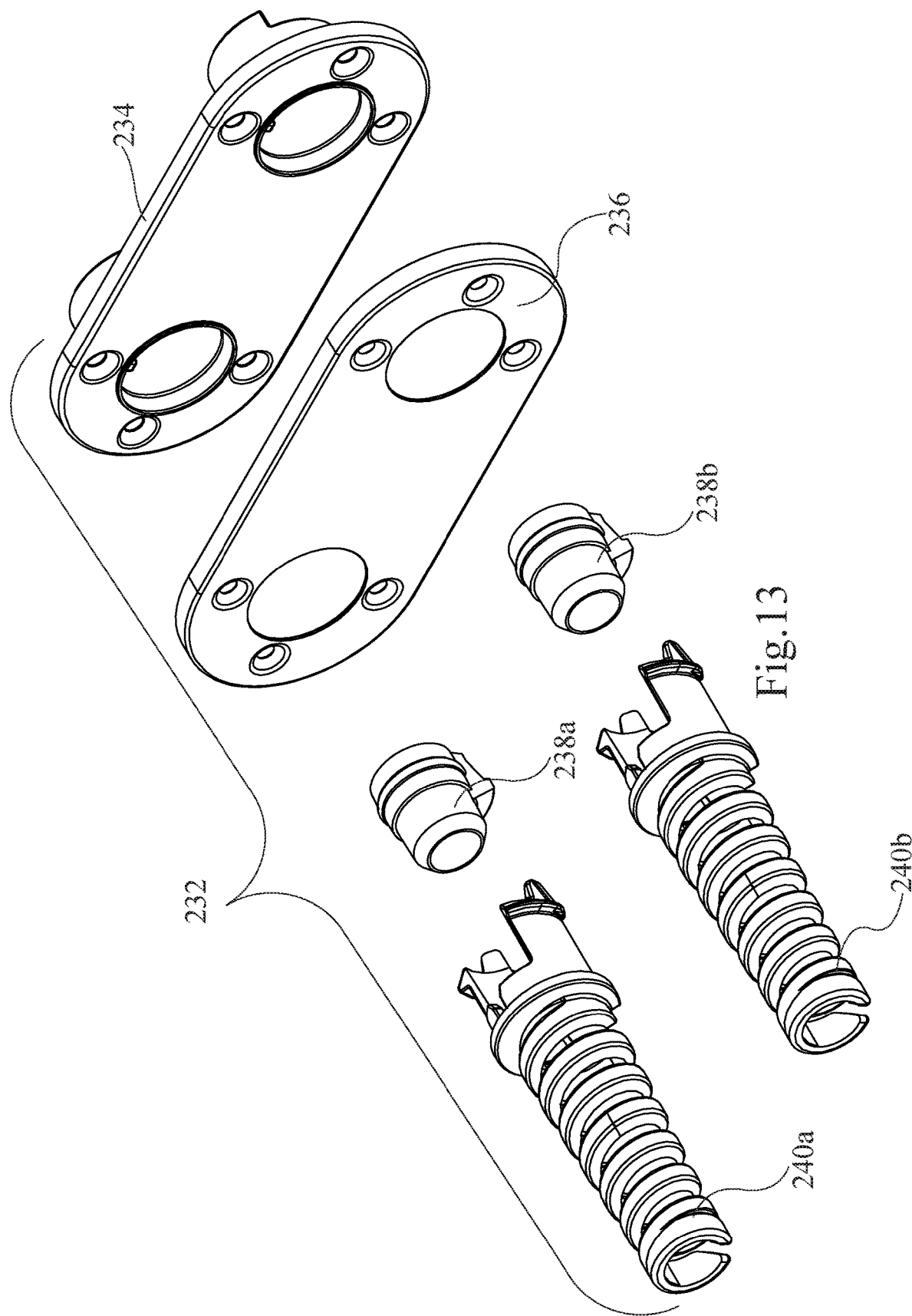
FIG. 13 is an exploded view of the bend restrictor assembly of FIG. 12.

Referring now to FIGS. 12 and 13, there is shown a second embodiment of a bend restrictor assembly 232. The bend restrictor assembly 232 is substantially similar in structure and function to the bend restrictor assembly 32 described above and shown in FIGS. 1 and 9. However, the bend restrictor assembly 232 comprises a dual base plate 234 and a dual cover plate 236 which are each substantially oblong in shape. This allows the base plate 234 and the cover plate 236 to receive two grommets 238a and 238b and two coil members 240a and 240b.

Figure 14:
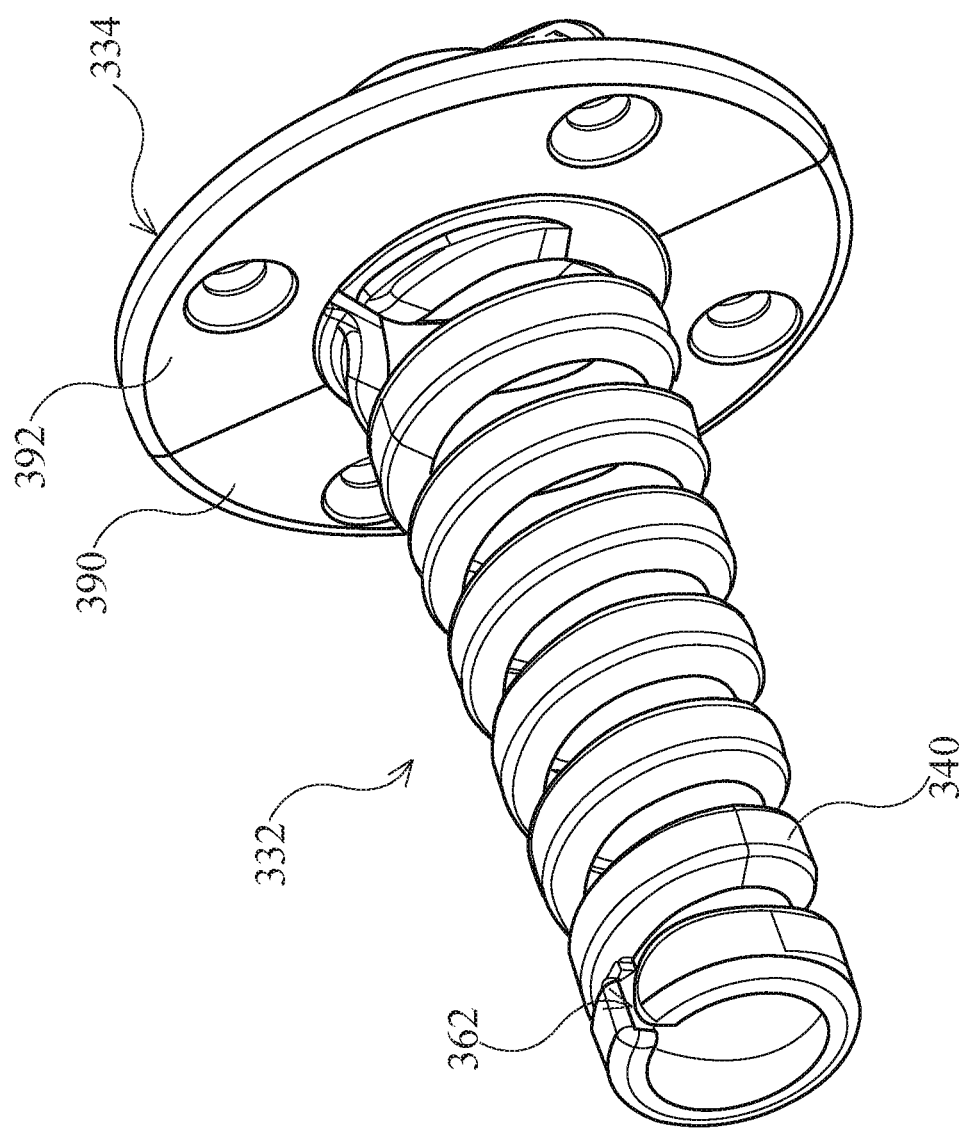
FIG. 14 is a front perspective view of a third embodiment of a bend restrictor assembly.
Figure 15:
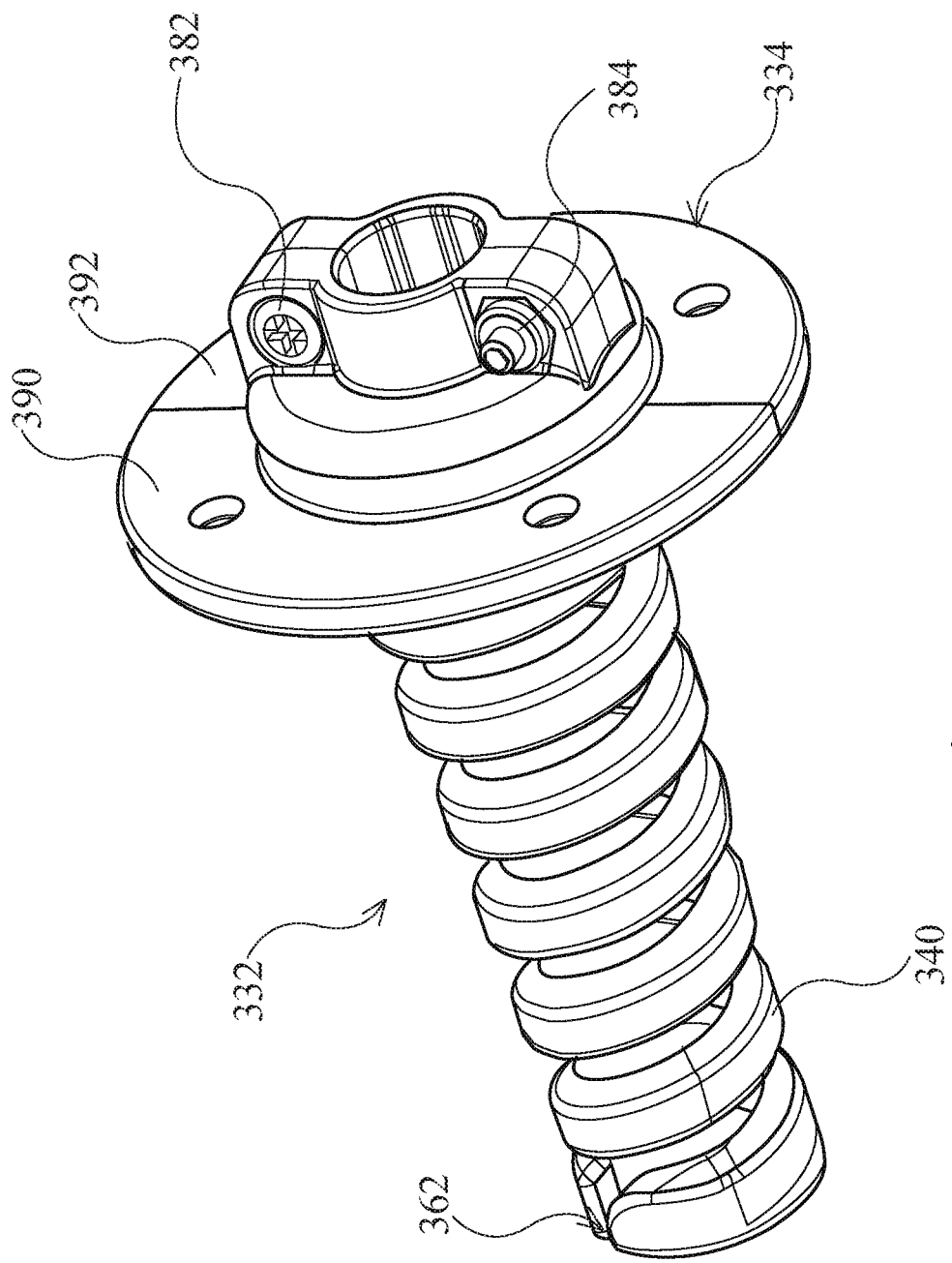
FIG. 15 is a rear perspective view of the bend restrictor assembly of FIG. 14.
Figure 16:
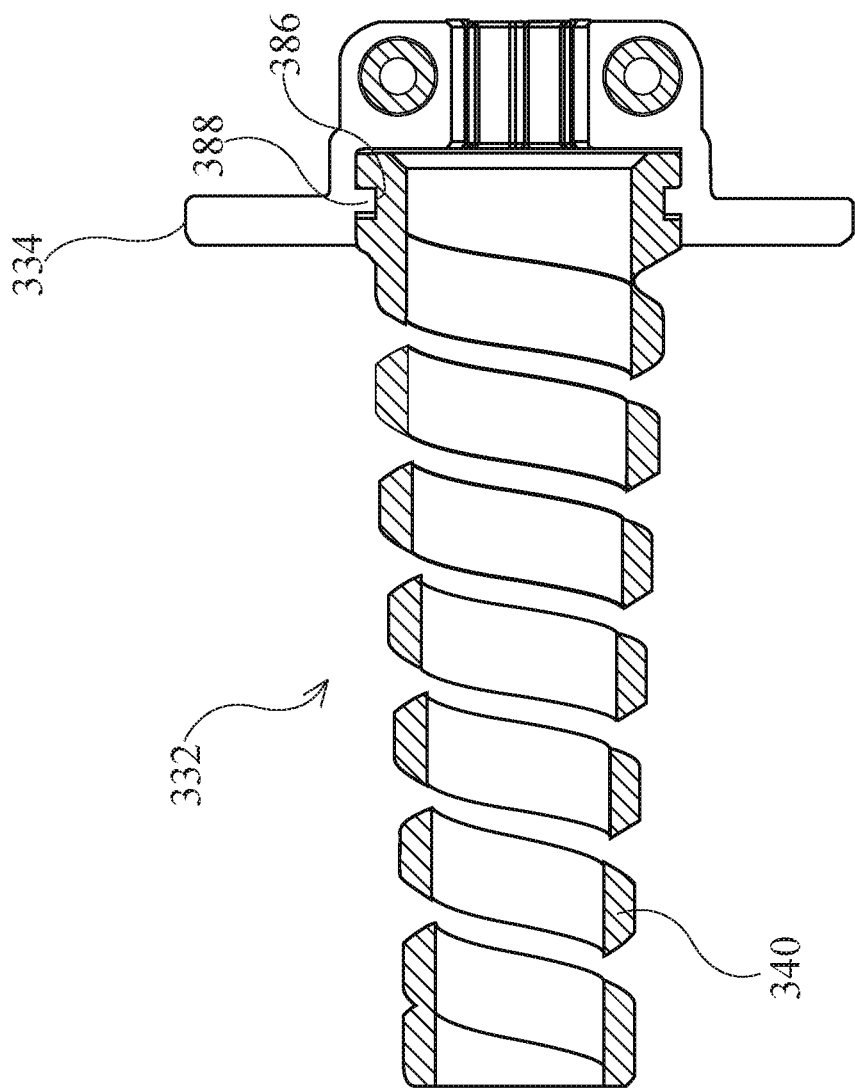
FIG. 16 is a cross-sectional view of the bend restrictor assembly of FIG. 14.

Referring now to FIGS. 14 to 16, there is shown a third embodiment of a bend restrictor assembly 332. Like parts have like numbers and functions as the bend restrictor assembly 32 described above and shown in FIGS. 1 to 9 with the addition of "300". The bend restrictor assembly 332 includes a base plate 334 and a coil member 340. However, the coil member 340 does not have tabs which are insertable into the base plate 334 to couple the coil member 340 to the base plate 334. Rather, the coil member 340 has an annular groove 386 which mates with an annular rib 388 of the base plate 334 as best shown in FIG. 16. The base plate 334 comprises two halves 390 and 392 which interlock to clamp onto the coil member 340. In this example, the two halves 390 and 392 are each generally crescent-shaped. The coil member 340 in turn clamps onto the hose to restrict relative axial and rotational movement of the hose. The two halves 390 and 392 of the base plate 334 may be coupled together by fasteners, for examples, fasteners 382 and 384 as shown in FIG. 15.

Figure 17:
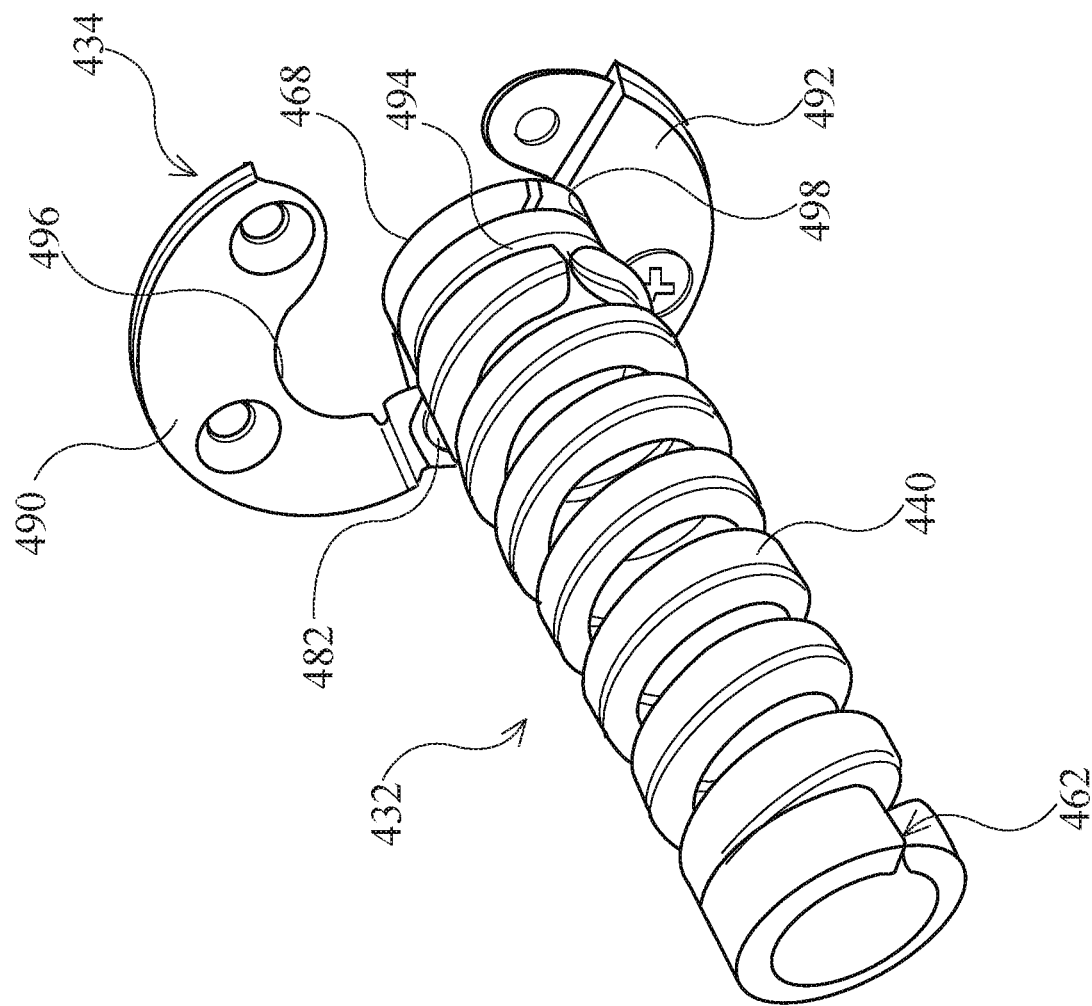
FIG. 17 is a front perspective view of a fourth embodiment of a bend restrictor assembly.
Figure 18:
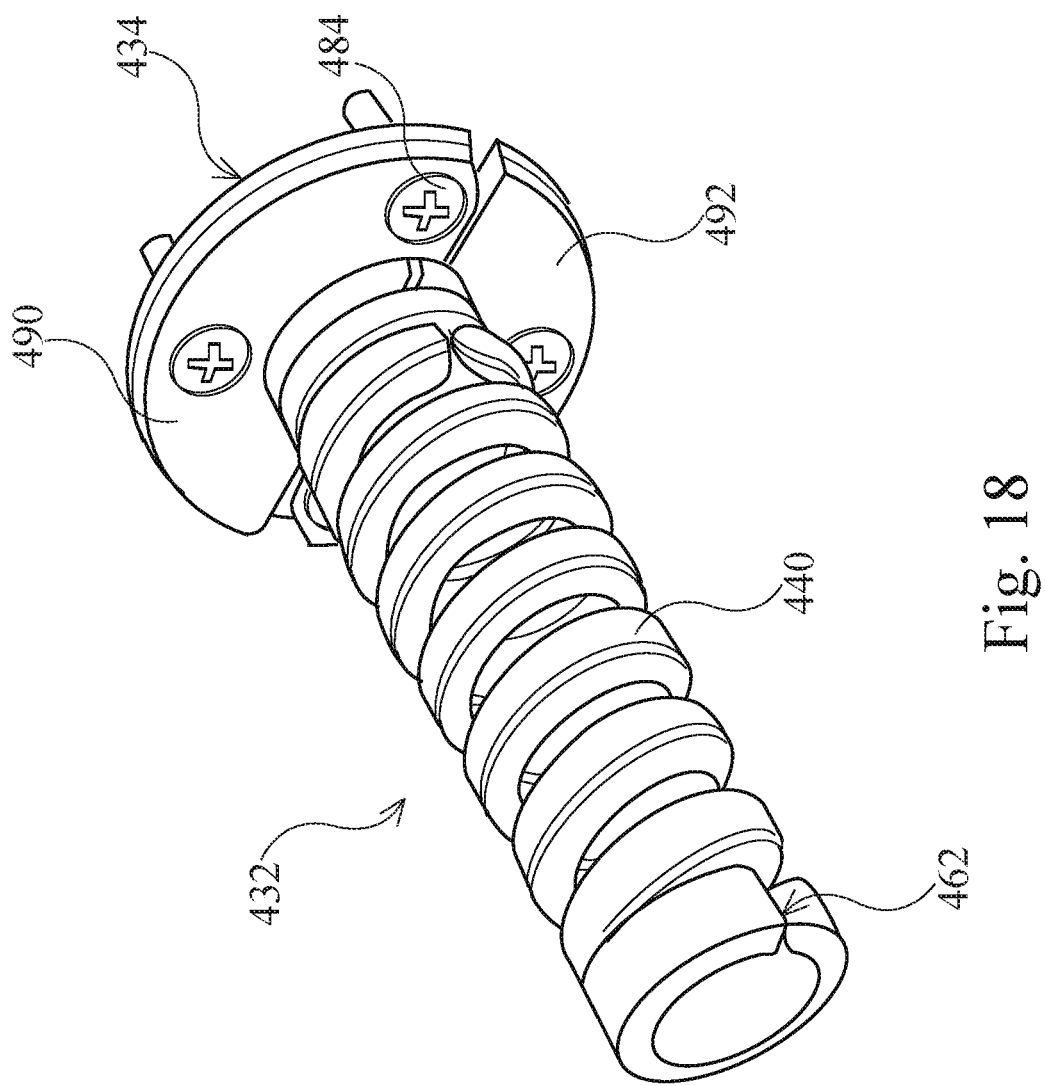
FIG. 18 is another front perspective view of the bend restrictor assembly of FIG. 17.

Referring now to FIGS. 17 and 18, there is shown a fourth embodiment of a bend restrictor assembly 432. Like parts have like numbers and functions as the bend restrictor assembly 32 described above and shown in FIGS. 1 to 9 with the addition of "400". The bend restrictor assembly 432 includes a base plate 434 and a coil member 440. The base plate 434 comprises a semi-circular or crescent-shaped top portion 490 and a semi-circular or crescent-shaped bottom portion 492. The top portion 490 and the bottom portion 492 may be hingedly connected together, for example, by a fastener 482 which allows the top portion 490 to pivot relative to the bottom portion 492. This allows the base plate 434 to hinge between an open configuration shown in FIG. 17 and a closed configuration shown in FIG. 18. In the open configuration shown in FIG. 17, the base plate 434 can receive a proximal end 468 of the coil member 440. The coil member 440 has an annular groove 494 which mates with a semi-circular inner edge 496 of the top portion 490 and a semi-circular inner edge 498 of the bottom portion 492 to hold the coil member 492 in place. As the base plate 434 is moved to the closed configuration shown in FIG. 18, the base plate 434 clamps onto the coil member 440. The coil member 440 in turn clamps onto the hose to restrict relative axial and rotational movement of the hose. The top portion 490 and the bottom portion 492 of the base plate 434 may be coupled together by another fastener 484. Additional clamping force may also be provided by a further clamping device such as a hose clamp or a zap strap.

Figure 19:
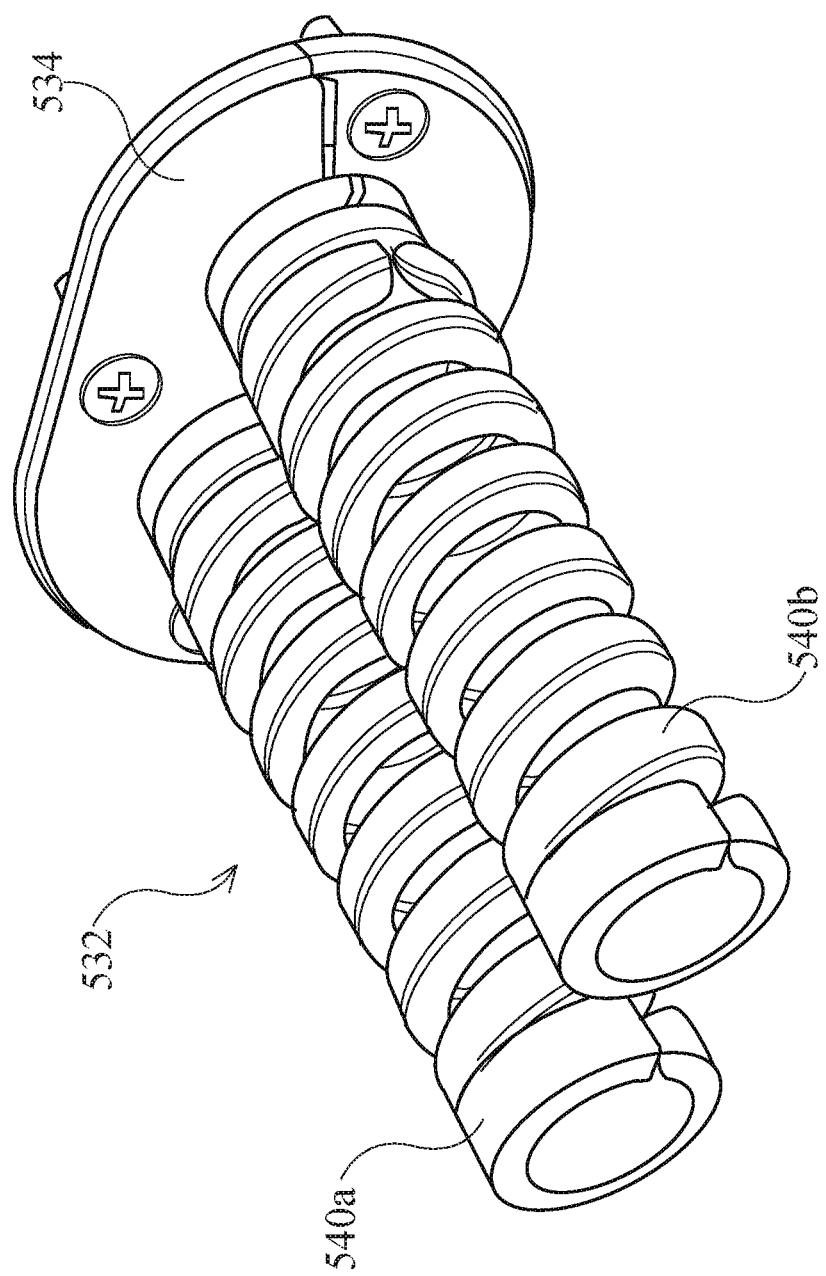
FIG. 19 is a front perspective view of a fifth embodiment of a bend restrictor assembly.

Referring now to FIG. 19, there is shown a fifth embodiment of a bend restrictor assembly 532. The bend restrictor assembly 532 is substantially similar in structure and function to the bend restrictor assembly 432 described above and shown in FIGS. 17 and 18. However, the bend restrictor assembly 532 comprises a dual base plate 534 which is substantially oblong in shape. This allows the base plate 534 to receive two coil members 540a and 540b which each receive a grommet.

It will be understood by a person skilled in the art that many of the details provided above are by way of example only, and are not intended to limit the scope of the invention which is to be determined with reference to the following claims.

What is claimed is:

1. A hose assembly for a marine vessel bulkhead, the hose assembly comprising:
a hose having a first end with a first hose fitting and a second end with a second hose fitting;
a base plate having an opening which receives the hose, the base plate being positioned on the hose between the first hose fitting and the second hose fitting;
a bend restrictor releasably coupled to the base plate, the bend restrictor having coils which wrap around the hose; and
a cover plate positioned over the base plate;
wherein the base plate clamps onto the bend restrictor and the bend restrictor clamps onto the hose, thereby restricting relative axial and rotational movement of the hose.

2. The hose assembly as claimed in claim 1, wherein the bend restrictor includes a plurality of circumferentially spaced-apart tabs extending outwardly about a first end thereof, the tabs interlocking with the base plate to couple the bend restrictor to the base plate.

3. The hose assembly as claimed in claim 2, wherein each of the tabs has a barbed tip.

4. A hose assembly for a marine vessel bulkhead, the hose assembly comprising:
a hose having a first end with a first hose fitting and a second end with a second hose fitting;
a base plate having an opening which receives the hose, the base plate being positioned on the hose between the first hose fitting and the second hose fitting;
a bend restrictor releasably coupled to the base plate, the bend restrictor having coils which wrap around the hose; and
an annular insert disposed between the hose and the bend restrictor;
wherein the base plate clamps onto the bend restrictor and the bend restrictor clamps onto the hose, thereby restricting relative axial and rotational movement of the hose;
wherein the bend restrictor has a first end with a first gap and a second end with a second gap, and
wherein the first gap is wider than the second gap to receive the annular insert.

5. The hose assembly as claimed in claim 4, wherein the annular insert has a longitudinal slit, the annular insert being insertable over the hose at the slit.

6. A hose assembly for a marine vessel bulkhead, the hose assembly comprising:
a hose having a first end with a first hose fitting and a second end with a second hose fitting;
a base plate having an opening which receives the hose, the base plate being positioned on the hose between the first hose fitting and the second hose fitting; and
a bend restrictor releasably coupled to the base plate, the bend restrictor having coils which wrap around the hose;
wherein the base plate clamps onto the bend restrictor and the bend restrictor clamps onto the hose, thereby restricting relative axial and rotational movement of the hose, and
wherein the base plate includes two interlocking halves.

7. A hose assembly for a marine vessel bulkhead, the hose assembly comprising:
a hose having a first end with a first hose fitting and a second end with a second hose fitting;
a base plate having an opening which receives the hose, the base plate being positioned on the hose between the first hose fitting and the second hose fitting; and
a bend restrictor releasably coupled to the base plate, the bend restrictor having coils which wrap around the hose;
wherein the base plate clamps onto the bend restrictor and the bend restrictor clamps onto the hose, thereby restricting relative axial and rotational movement of the hose, wherein the base plate includes a first portion and a second portion, and wherein the first portion and the second portion are hingedly connected to allow the first portion to pivot relative to the second portion.

8. The hose assembly as claimed in claim 1, wherein the base plate is a dual base plate configured to receive two bend restrictors.

9. A method of installing a bend restrictor assembly on a hose for a marine vessel bulkhead, the hose having a first end with a first hose fitting and a second end with a second hose fitting, the method comprising:

inserting a base plate with an opening over the first hose fitting and onto the hose;

inserting the hose through a first gap in a bend restrictor, wrapping coils of the bend restrictor around the hose, and inserting the hose through a second gap of the bend restrictor;

inserting the hose through a slit in an annular insert, the annular insert being received by the first gap in the bend restrictor; and inserting the bend restrictor into the opening of the base plate, thereby compressing the first gap of the bend restrictor so that the bend restrictor clamps onto the annular insert and the hose to restrict relative axial and rotational movement of the hose.

10. A method of installing a bend restrictor assembly on a hose for a marine vessel bulkhead, the hose having a first end with a first hose fitting and a second end with a second hose fitting, the method comprising:

inserting the hose through a first gap in a bend restrictor, wrapping coils of the bend restrictor around the hose, and inserting the hose through a second gap of the bend restrictor; and clamping two crescent-shaped halves of a base plate over the bend restrictor near the first gap thereof so that the bend restrictor clamps onto the hose to restrict relative axial and rotational movement of the hose.

11. The method as claimed in claim 10, wherein clamping two crescent-shaped halves of the base plate over the bend restrictor comprises interlocking and coupling the two crescent-shaped halves together with a fastener.

12. The method as claimed in claim 10, wherein clamping two crescent-shaped halves of the base plate over the bend restrictor comprises pivoting a first crescent-shaped half of the base plate relative to a second crescent-shaped half of the base plate.

* * * * *